June 24, 1930. H. G. TATOSIAN 1,765,464
ICE CREAM CONE MACHINE
Filed April 29, 1930 6 Sheets-Sheet 1

Inventor
Harry G. Tatosian
Chamberlain & Newman
Attorneys

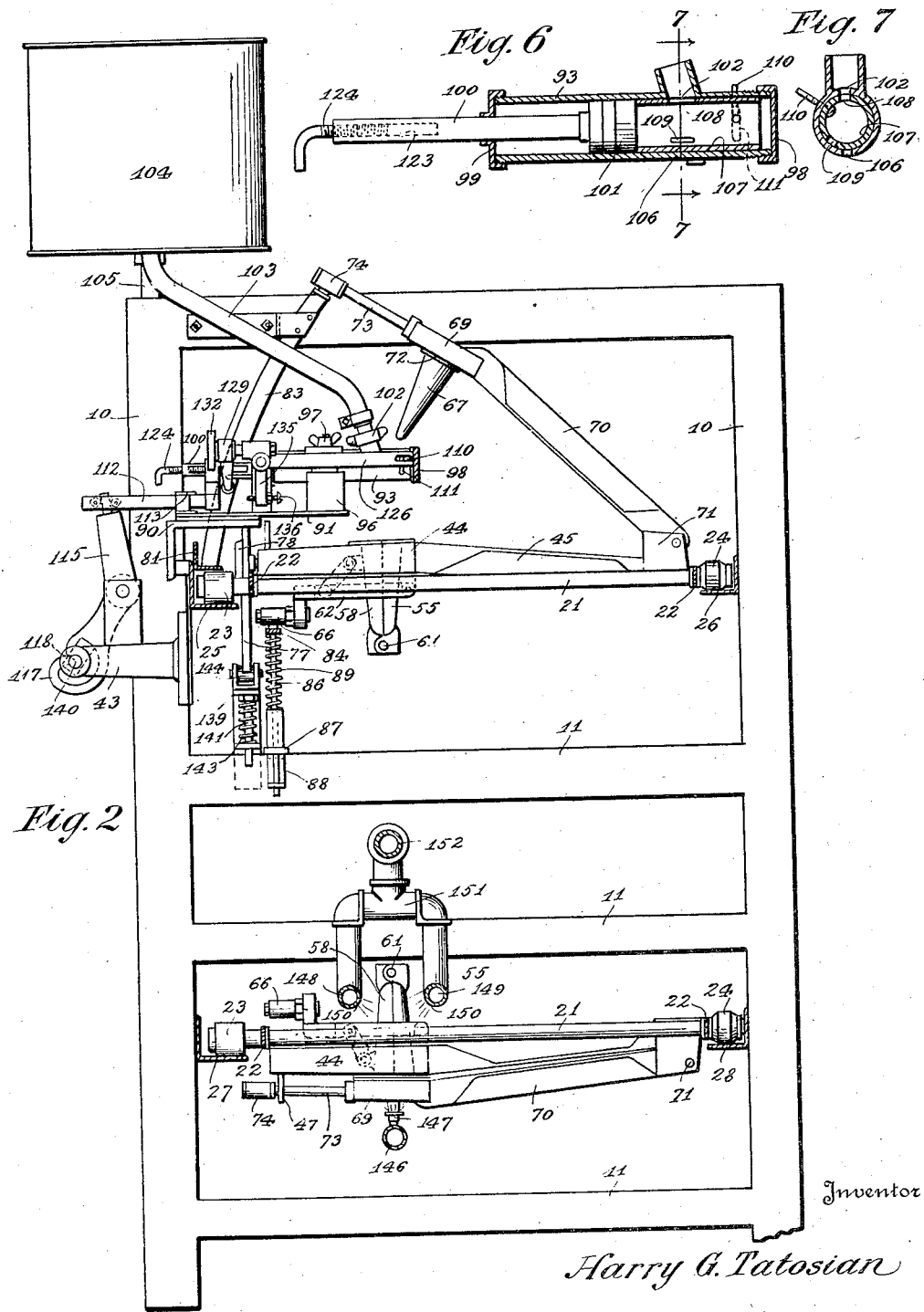

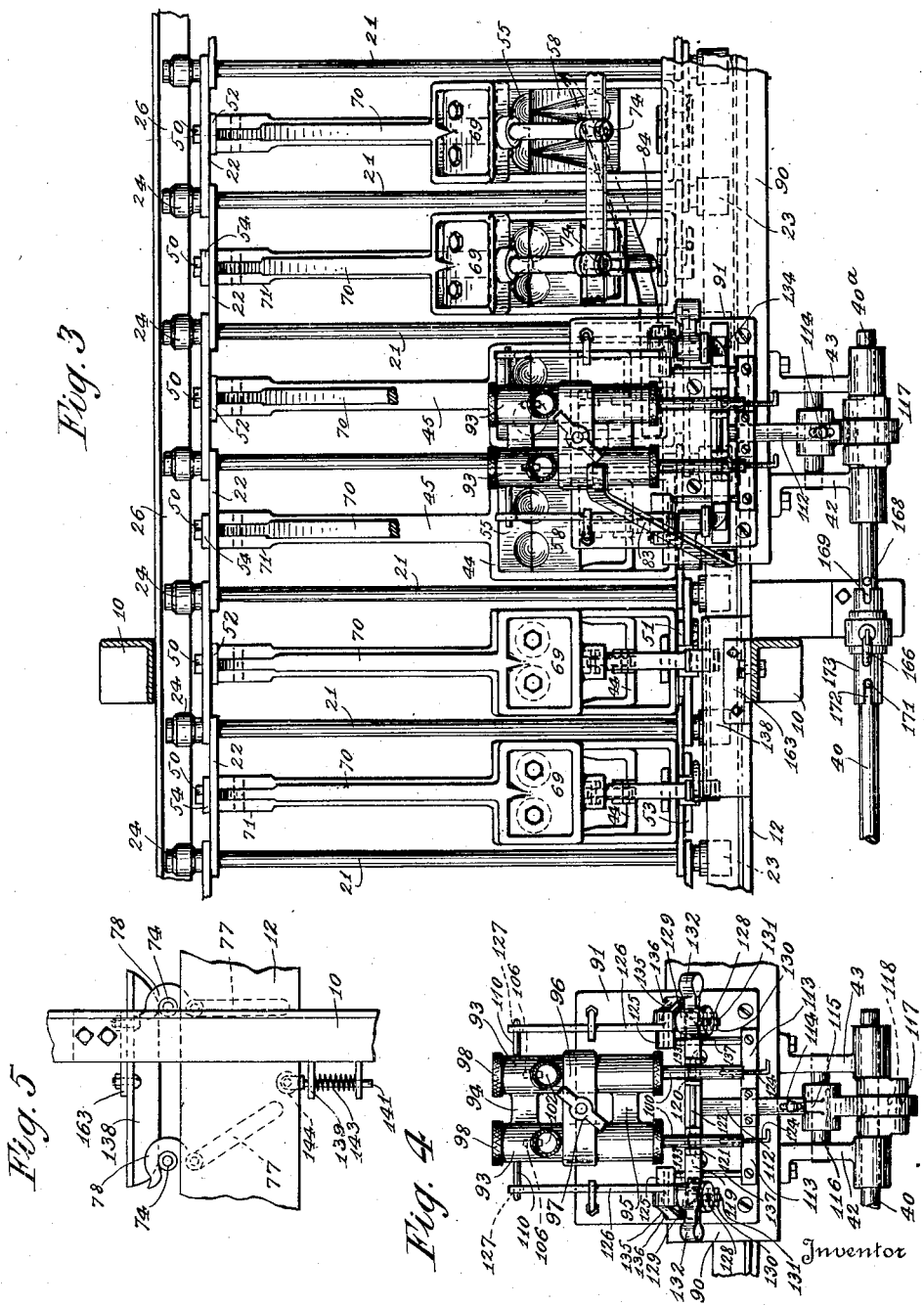

June 24, 1930. H. G. TATOSIAN 1,765,464
ICE CREAM CONE MACHINE
Filed April 29, 1930   6 Sheets-Sheet 4
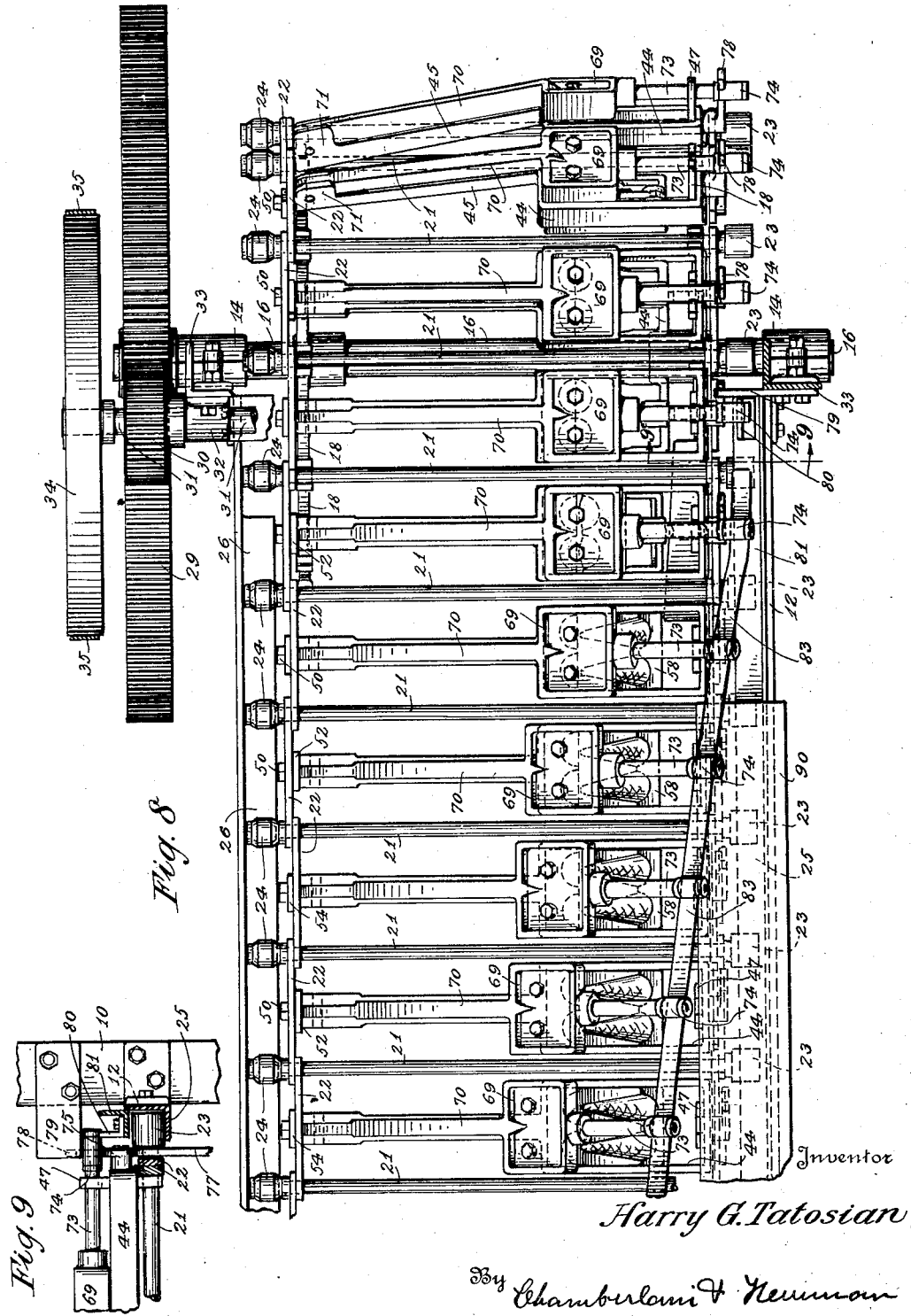

June 24, 1930. H. G. TATOSIAN 1,765,464
ICE CREAM CONE MACHINE
Filed April 29, 1930 6 Sheets-Sheet 5
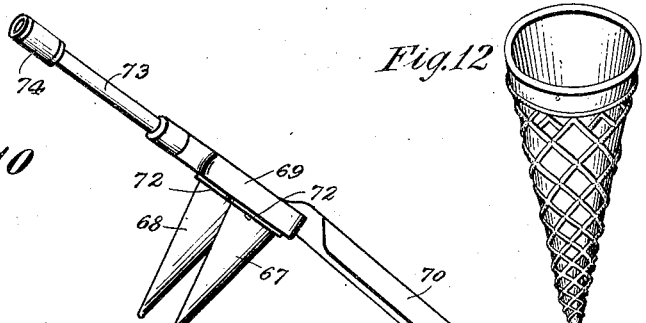
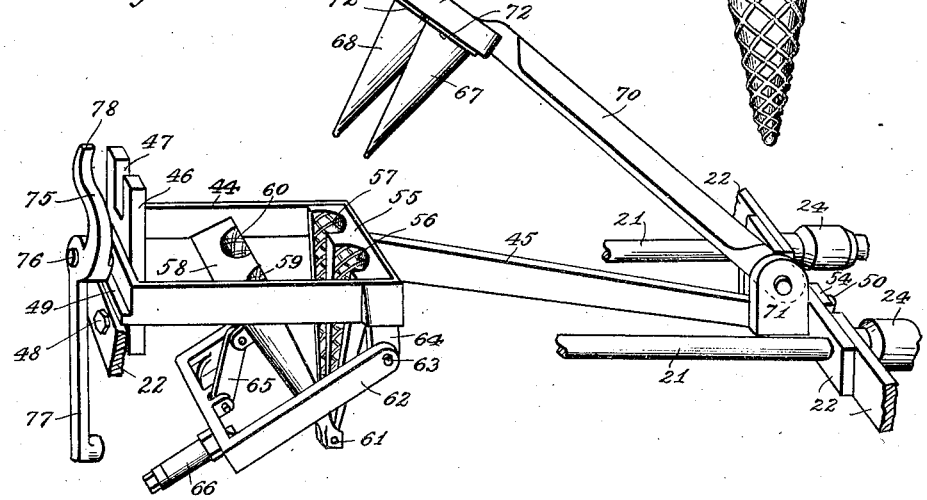
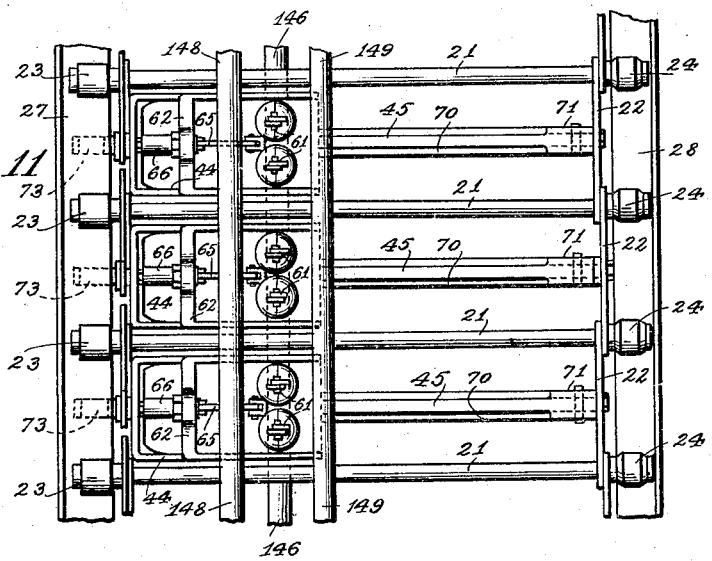
Inventor
Harry G. Tatosian
By Chamberlain & Newman
Attorneys June 24, 1930.  H. G. TATOSIAN  1,765,464
ICE CREAM CONE MACHINE
Filed April 29, 1930   6 Sheets-Sheet 6

INVENTOR.
Harry G. Tatosian
BY
Chamberlain & Newman ATTORNEYS.

Patented June 24, 1930

1,765,464

UNITED STATES PATENT OFFICE

HARRY G. TATOSIAN, OF BRIDGEPORT, CONNECTICUT, ASSIGNOR TO ICE CREAM CONE MACHINERY INC., OF BRIDGEPORT, CONNECTICUT, A CORPORATION OF CONNECTICUT

ICE-CREAM-CONE MACHINE

Application filed April 29, 1930. Serial No. 448,360.

The present invention relates to an improved machine for making pastry cones, such as are used for instance for containing ice cream, an object of the invention being to provide a machine in which such cones may be made automatically and with relatively great speed and uniformity. A further object is to enable the machine to be tended by a single operator, who may conveniently control the various operations, and at the same time remove the completed cones with ease.

A still further object is to provide improved molds by means of which the cones, after baking, will be freed so that their removal may be effected without danger of breaking.

Another object is to provide an improved batter feed device, which will accurately measure the batter supplied for each cone, and which may be precisely synchronized with the operations of the mold.

With the above and other objects in view, an embodiment of the invention is shown in the accompanying drawings, and this embodiment will be hereinafter more fully described with reference thereto, and the invention will be finally pointed out in the claims.

In the drawings:—

Fig. 2 is a vertical sectional view along the line 2—2 of Fig. 1;

Fig. 3 is a plan view of the intermediate portion of the machine, and showing the batter feed device in its non-feeding position;

Fig. 4 is a plan view of the batter feed device and showing the same in its feeding position;

Fig. 5 is a fragmentary detail front elevation of the means for closing the molds after the same are filled with batter;

Fig. 6 (sheet 2) is an enlarged longitudinal sectional view of one of the batter feed devices;

Fig. 7 is a sectional view thereof taken along the line 9—9 of Fig. 8;

Fig. 8 is a plan view of the end of the machine at the right of the portion shown in Fig. 3;

Fig. 9 is a vertical sectional view taken along the line 9—9 of Fig. 8;

Fig. 10 is a perspective view of one of the molds and showing the same in open position;

Fig. 11 is a plan view of a portion of the lower part of the machine, and showing the molds inverted and in relation to the gas jets;

Fig. 12 is a perspective view of a completed cone;

Similar reference characters indicate corresponding parts throughout the several figures of the drawings.

This application is a substitute for my abandoned case Ser. No. 620,362 filed February 21, 1923.

Figure 1:
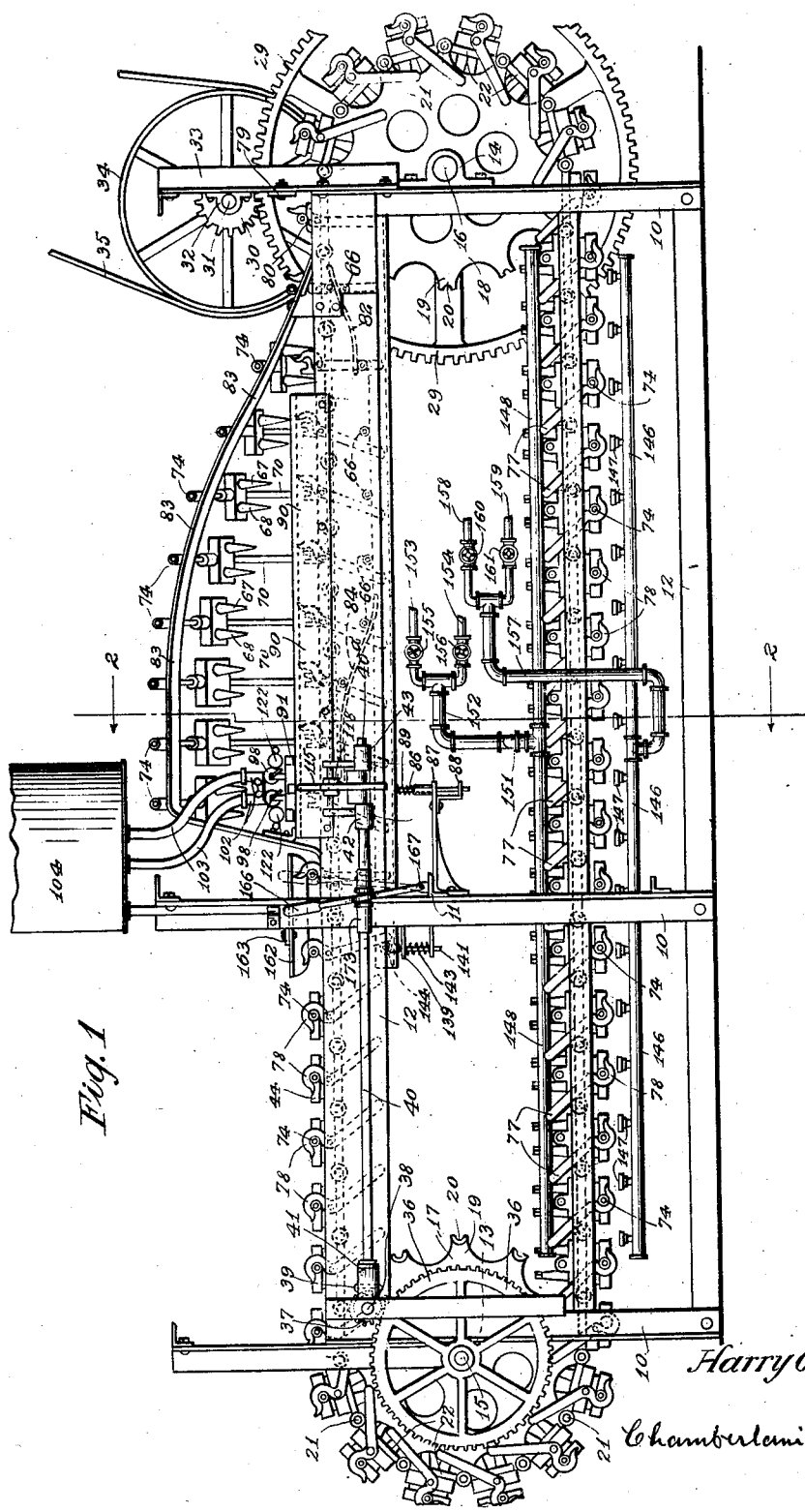
Fig. 1 is a front elevation of a machine according to the present embodiment of the invention.
Figure 13:
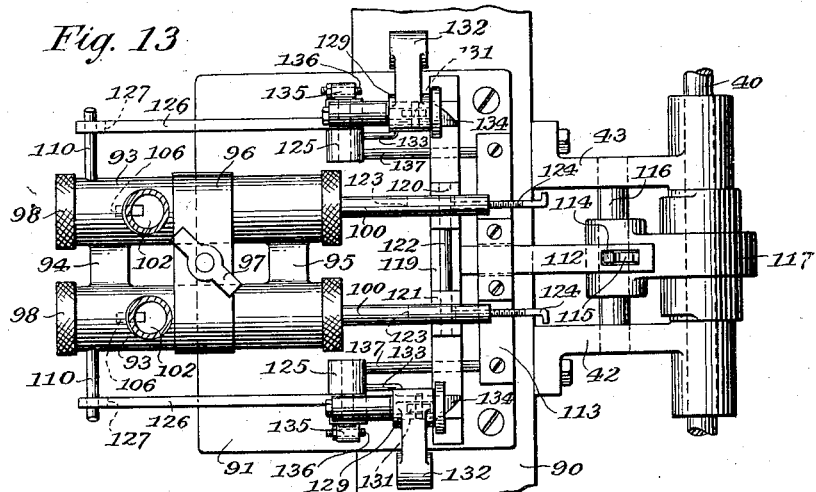
Fig. 13 is an enlarged detail plan view of the batter feed mechanism, the same being in non-feeding position.
Figure 14:
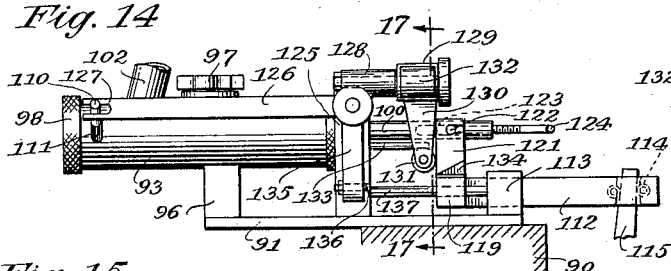
Fig. 14 is a side view thereof, in the same position.
Figure 17:
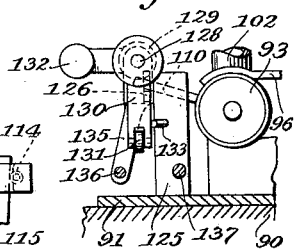
Fig. 17 is a sectional view, taken along the line 17—17 of Fig. 14.
Figure 15:
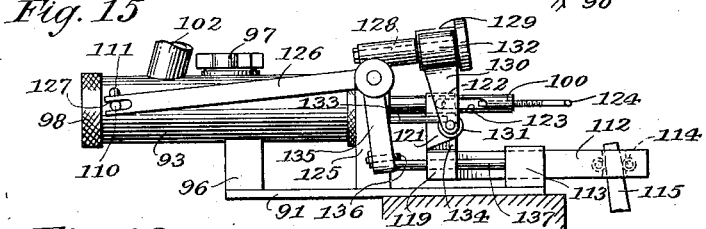
Fig. 15 is a similar view, showing the same in feeding position.
Figure 16:
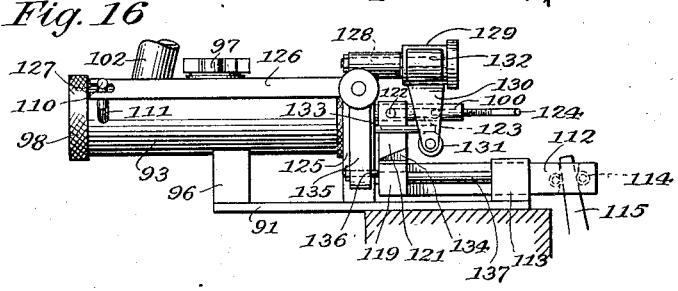
Fig. 16 is another similar view, showing the same at the end of the forward or feeding stroke.

Referring to the drawings, and particularly to Fig. 1 thereof, the frame of the machine comprises uprights 10 at the ends, and longitudinal and transverse bars 11 and 12, these being suitably arranged to support the various parts of the machine, as will hereinafter more fully appear.

At the ends of the frame there are journaled in bearings 13 and 14 the respective transverse shafts 15 and 16, upon which are mounted pairs of driving sprocket wheels 17 and 18. These wheels are provided with radial projecting portions 19 having semi-cylindrical seats 20 formed therein, and in which are engaged the transverse parallel rods 21 of an endless conveyor adapted to carry the cone forming molds. The rods are connected by staggered and overlapping links 22, and disposed at the outer sides of the sprocket wheels. Rollers 23 and 24 are provided on the respective ends of the rods, and adapted to ride upon longitudinal upper and lower pairs of tracks 25, 26, 27 and 28 arranged tangentially of the sprockets, so that as the rods 21 leave the seats 20 of the sprockets the rollers 23 and 24 engage the tracks, and the conveyor is therefore supported in a horizontal position in its movement between the sprockets.

The shaft 16 is provided at its rear end with a large gear 29, meshed by a driving pinion 30 provided upon a shaft 61 journaled in bearings 32 mounted on extension supports 33 of the uprights 10, and also carrying a pulley 34, over which a belt 35 extends from a suitable driving pulley. The sprockets 18 are thus positively driven, while the sprockets 17 are rotated through the movement of the conveyor.

Upon the forward end of the shaft 15 there is provided a gear 36 meshing with a combination spur and bevel pinion 37 journaled upon the frame at 38, and meshing with a bevel gear 39 at the end of a longitudinal shaft 40, journaled in a bearing 41 at one end. The other end of this shaft is operatively mounted in a clutch sleeve 173 which also encloses an aligned shaft 40ª that is journaled in bearings 42 and 43. This sleeve 173 is slidably mounted on the enclosed ends of these two aligned shafts and serves to operatively connect and disconnect the same for controlling the action of the pump. The sleeve is provided with a relatively long slot 172 at one end which is in slidable engagement with a fixed pin 171 carried by the shaft 40. A shorter slot 169 is provided in the other end of the sleeve to engage and disengage a pin 168 carried by the driven shaft 40ª. This clutch sleeve is operated by a hand lever 166 that is operatively connected with the sleeve and is hingedly supported at 167 to a bracket of the frame. These shafts 40 and 40ª are adapted, as will hereinafter more fully appear, to drive the batter feed device in synchronism with the movement of the conveyor.

The cone molds are of identical construction, and are supported upon the conveyor, one between each pair of rods 21. One of the molds is shown in detail and in its open position in Fig. 10, and comprises a rectangular frame 44 at the forward end of an arm 45, and provided at the inner side of its forward portion with a plate 46, having a recess 47 formed in its upwardly projecting portion and having its downwardly projecting portion removably secured to one of the links of the conveyor by a bolt 48. A flange 49 along the lower forward edge of the frame 44 rests upon the upper surface of the link, to maintain the mold in horizontal position. The arm 45 is removably connected at its rear end to one of the links 32 by a bolt 50. As before pointed out, the links are staggered and the outwardly disposed alternate links at the front and rear of the conveyor are therefore provided upon their inner sides with spacing blocks 51 and 52, to permit of the uniform attachment and alignment of the molds. The other alternate links are similarly provided with spacing blocks 53 and 54 at their outer sides.

Within the rear end portion of the frame 44 there is secured a depending stationary half-mold section 55, having its upper surface substantially flush with the upper surface of the frame, and provided with two semi-cone shaped recesses 56 and 57. A similar movable half-mold section 58 having semi-cone shaped recesses 59 and 60 in opposed and cooperating relation to the recesses 56 and 57 is hinged at 61 to the lower end of the mold section 55, and is adapted to be moved into and out of relation with said section 55, to close and open the mold, by means of a yoke 62 hingedly connected at 63 to lugs 64, formed on the under side of the frame 44, the yoke being connected by a toggle-link 65 with the mold 58. A forwardly projecting post 66 on the yoke is adapted by engagement with suitable cams, hereinafter referred to, to raise and lower the yoke, to thereby close and open the mold. The toggle link is so arranged that in closing it is forcibly moved beyond the dead centers of its pivoted ends, and the mold is thus positively held in closed position; the opening operation being substantially similar, in that the yoke is forced downwardly over the dead centers.

The outer contour of the mold sections 55 and 58 is uniformly spaced from the surface of the mold recesses, so that heat applied to the exterior will uniformly bake the batter within the molds.

The cone forming cores 67 and 68, which are adapted to be engaged with the closed mold in uniformly spaced relation with the cone-shaped recesses thereof, are mounted upon a plate 69 provided upon the forward end of a lever arm 70 hingedly connected at its rear end to ears 71 formed upon the rear end of the arm 45.

The cores are provided at their large ends with a flange 72 adapted to close the upper end of the mold recess when lowered into engagement with the mold.

A forwardly projecting post 73 is provided on the plate 69 adapted in the lowered position of the cores to engage in the recess 47, and provided at its forward end and forwardly of the plate 46 with a roller 74 adapted to co-operate with a cam, hereinafter referred to, to raise and lower the cores, and to be engaged in the lowered position by a hook shaped clamp 75, having its hub portion pivotally supported at 76 upon the frame 44, and provided with a downwardly depending weighted arm 77, adapted in the raised position of the cores to maintain the hooked end at one side of the recess 47, so that the post 73 may be freely lowered into the recess. The clamping hook is thereafter operated by suitable cams, hereinafter referred to, to be engaged and disengaged with the roller.

As the molds are conveyed from the sprocket 18, at the right, along the upper horizontal traverse, the upper deflected end 78 of the clamp hook 75 first engages a trip plate or cam 79 (Figs. 1, 8 and 9) mounted upon and projecting inwardly from the forward upright 33, and is thereby disengaged from the roller 74 of the post 73 to release the cores from the molds. The roller 79 thereupon rides over a short lifting cam 80 which first slightly lifts the cores in the molds, and then lowers them again, to thereby loosen the cones in the molds, preparatory to their removal.

During the movement of the rollers 23 along the rail track 25 they are retained against any possibility of lifting by an upper longitudinal retaining rail 81.

The cone mold now starts to open, and for this purpose a downwardly inclined cam 82 is provided upon the frame beneath the conveyor, the post 66 of the yoke 62 engaging this cam and gradually opening the mold, which remains in such open position until closed by another cam, presently to be described.

As soon as the mold starts to open the roller 74 rides upon a cam rail 83, which gradually lifts the cores out of engagement with the open molds, permitting the operator to remove the completed cones from the raised cores, upon which they are carried from the open molds.

Before the cores are again lowered by the cam 83, which is designed with a long gradual rise and a short quick drop, the molds are again closed and filled with batter. An upwardly inclined cam rail 84 is mounted upon the frame beneath the conveyor, its lower end being loosely mounted, as at 85, and its upper end being slightly yielding by means of a dash-pot support, comprising a rod 86 guided through an apertured rail 87 and a stirrup 88, and having a spring 89 mounted thereon to exert an upward force on the cam rail. The roller 66 rides upon this rail and is thereby gradually raised to close the mold, being forced beyond the dead centers of the link 65 to positively lock the mold in its closed position.

The closed molds with the cores in their extreme raised position now move into relation with the batter feeding device. A raised platform 90 is mounted at the front of the frame, and upon its left hand end there is secured a plate 91 for mounting the feed device, the platform also serving as a table upon which the operator may place the finished cones.

Upon a suitable pillar 92 at the inner end of the plate 91 there are mounted a pair of parallel cylinders 93, connected by webs 94 and 95, and removably secured upon the pillar by means of a clamping plate 96 and a wing nut and bolt 97. As clearly shown in Figs. 6 and 7 the cylinders are closed at their forward ends by means of a cap 98, and at their rearward ends by an apertured cap 99, in which is guided the stem 100 of a reciprocating plunger or piston 101. An inlet opening 102 is provided in the top of each cylinder forwardly of the piston and is connected by a flexible tube 103 with a raised batter supply tank 104, mounted on a suitable support 105. An outlet slot 106 is provided in the lower side of the cylinder and for the purpose of alternately opening and closing the opening 102 and slot 106, a rotary sleeve or valve 107 having an opening 108 and a slot 109 therein, is provided in each cylinder and is adapted to be turned to bring said opening 108 and slot 109 into alternate register with the opening 102 and slot 106. A finger 110 is provided on each sleeve and projects through a slot 111 of the cylinder, the raised position of the finger registering the openings 102 and 108, the slot 106 being closed; while in the lowered position the slots 106 and 109 are registered and the opening 102 is closed. In the former position the piston 101 is adapted to be reciprocated rearwardly to draw batter into the cylinder, and in the latter position the piston is reciprocated forwardly to eject the batter, which drops into the molds, the movement of the conveyor and the ejection of the batter being properly synchronized for this purpose.

The mechanism for automatically operating the piston 101 and the sleeve 107 comprises a slide rod 112 adapted to reciprocate through a guide-block 113 and pivotally connected at its outer slotted end 114 to the upper end of a bell crank lever 115, having its hub portion rotatably mounted on a shaft 116 supported in the brackets 42 and 43. The other arm is in the form of a heart cam 117, and is engaged by an eccentric roller 118 carried by the shaft 40 and adapted through rotation of the shaft to oscillate the bell crank and thereby reciprocate the slide 112.

At the forward end of the slide bar there is mounted a cross bar 119 provided at its intermediate portion with pairs of upstanding lugs 120 and 121 supporting a cross rod 122, which extends through longitudinal slots 123 provided in the piston stems 100. The outer end of the slot has an adjustable screw 124 therein which determines the effective length of the slot. During the forward reciprocation of the slide, it first moves without moving the pistons, until the cross rod 122 engages the forward ends of the slots, and for the remainder of its forward movement it carries the pistons with it. During the rearward reciprocation, the piston remains stationary during the initial rearward movement of the slide, and is moved during the remainder of the rearward movement. During the initial and final periods of forward reciprocation of the slide it is adapted to operate the sleeve 107 to respectively open and close the openings 102 and the slots 106.

At the outer sides of the cylinders 95 there are mounted pillars 125, each pivotally supporting a lever 126 extending longitudinally of the cylinders, and having its forward slotted end 127 engaged with the finger 110. A post 128 extends rearwardly of the hub of the lever and has a member 129 rotatably supported thereon, and provided with a depending arm 130 having a roller 131 at its lower end, while a weighted arm 132 extends laterally at one side of the member, and which normally retains the arm 130 in engagement with a stop pin 133.

Upon each end of the slide bar there is provided a cam 134 in the path of the rollers 131, and having a beveled upper face and a rounded rear face. The hub of the lever 126 is provided with a downwardly extending arm 135 provided at its lower end with an adjustable contact screw 136 and disposed in the path of forward movement of the end of the slide bar 119. Stationary guide rods 137 for the slide bar 118 extend through passages therein between the block 113 and the pillars 125.

As the slide bar moves forwardly the beveled faces of the cams 134 engage the rollers 131 lifting the members 129 and depressing the forward ends of the levers 126, thereby turning the sleeve 107 to close the openings 102 and open the slots 106 of the cylinders. The continued forward movement of the slide causes the rod 122 to move the pistons forwardly thereby ejecting the batter through the outlet slots 106, the batter dropping into the molds. A still further and final forward movement of the slide causes the end of the bar 119 to engage the contact screws 136 to thereby lift the lever 126 and through rotation of the sleeve 107 close the slot 106 and open the opening 102.

During the rearward reciprocation of the slide the rounded rear faces of the cams 134 engage the rollers 131 and ineffectively rotate the member 129 about their axes, the rollers dropping into place in front of the cams, when the latter have cleared them. As the slide completes it rearward reciprocation the rod 122 engages the screw 124 and moves the pistons rearwardly, thereby drawing additional batter into the cylinders through the openings 102.

When it is desired to stop the feed of the batter, the rollers 131 may be swung out of the path of the cams 134 by merely throwing the weighted ends of the members 129 inwardly, and into engagement with the stop pins 133.

As the filled molds move out of relation with the batter feed device the cores drop into engagement therewith along the acute drop at the end of the cam rail 83. The rollers 74 thereupon move beneath a vertically disposed cam plate 138 secured by a bracket 163 to the intermediate upright 10 of the frame, and having its under surface curved upwardly at the ends. This cam depresses the cores into tight engagement with the molds to uniformly spread the batter therein, and to permit the better engagement of the hook clamps 75 with the rollers.

For this purpose a bracket 139 is pivotally mounted on the frame and a plunger rod 141 is slidably mounted therein, a spring 143 being provided on the rod between it and the bracket. A roller 144 is mounted in the top or head end of the plunger and in the path of the lower end of the arm 77 of the clamp, so that as the mold is carried along by the conveyor the arm 77 engages the roller 144 and the hook end 75 is thereby clampingly engaged with the roller 74, the yieldable support of the roller 144 permitting the arm 77 to move freely out of engagement therewith.

The closed molds filled with batter are now carried by the conveyor about the sprocket wheels 17, and are conveyed in inverted relation along the lower horizontal traverse, where they are subjected to heat to bake the cones.

A gas pipe 146 extends beneath the molds and is provided with a series of upwardly projecting nozzles 147, while a pair of gas pipes 148 and 149 extend at each side of the upwardly projecting cone molds, and are provided with jet openings 150 directed toward the molds. The pipes 148 and 149 are connected by a suitable union 151 to a feed pipe 152 to which gas and air are fed under pressure from pipes 153 and 154, and controlled by valves 155 and 156. The pipe 146 is similarly connected to a feed pipe 157 to which gas and air are fed by pipes 158 and 159, and controlled by valves 160 and 161.

The baking of the cones is completed as the molds move in relation to the gas jets, being sufficiently cooled as they move out of relation therewith to the removal point, to permit their removal upon opening of the molds and lifting of the cores.

I have illustrated a preferred and satisfactory embodiment of my invention, but it will be obvious that changes may be made therein within the spirit and scope thereof, as defined in the appended claims.

I claim:—

1. In a machine of the character described, a frame including pairs of upper and lower spaced parallel tracks, conveyor wheels at the ends of the frame, said tracks being substantially tangential thereto, a continuous conveyor extending about said wheels and along said tracks, mold sections carried by said conveyor and each comprising a two-part mold socket member hinged along an axis parallel with the line of movement of the conveyor and a core member hingedly mounted along an axis parallel with the line of movement of the conveyor, means for opening and closing said mold sections, means for supplying batter to said sections during their open period, and means for heating said sections to cook the batter therein.

2. In a machine of the character described, a frame including pairs of upper and lower spaced parallel tracks, conveyor wheels at the ends of the frame, said tracks being substantially tangential thereto, a continuous conveyor comprising spaced parallel transverse bars supported at their ends upon said wheels and said tracks, and links connecting said bars, mold sections carried by said conveyor in the spaces between said bars, and each comprising a mold socket member and a core member, means for opening and closing said mold sections, means for supplying batter to said sections during their open period, and means for heating said sections to cook the batter therein.

3. In a machine of the character described, a frame including pairs of upper and lower spaced parallel tracks, conveyor wheels at the ends of the frame, said tracks being substantially tangential thereto, a continuous conveyor comprising spaced parallel transverse bars supported at their ends upon said wheels and tracks, and links connecting said bars, mold sections carried by said conveyor in the spaces between said bars and removably secured at their ends to said links, and each comprising a mold socket member and a core member, means for supplying batter to said sections during their open period, and means for heating said sections to cook the batter therein.

4. In a machine of the character described, a frame including pairs of upper and lower spaced parallel tracks, conveyor wheels at the ends of the frame, and tracks being substantially tangential thereto, a continuous conveyor comprising spaced parallel transverse bars supported at their ends upon said wheels and tracks, and links connecting said bars, mold sections carried by said conveyor in the spaces between said bars, and each comprising a mold socket member and a core member hingedly connected to said mold socket member adjacent the links at the rear of the conveyor, and clamping means adjacent the links at the front of the conveyor adapted to clamp said mold socket member and core member together, means for opening and closing said mold sections, means for supplying batter thereto during their open period, and means for heating said sections to cook the batter therein.

5. In a machine of the character described, a continuous conveyor, a plurality of mold sections carried thereby, and each comprising a two-part book-mold socket member hinged along an axis parallel to the line of movement of the conveyor and having toggle means to retain the same in closed position and move it to open position and a core member, means for opening and closing said mold sections, means for supplying batter to said sections during their open period, clamping means adapted to retain said core members in engagement with said mold members, means actuated by the movement of the conveyor adapted to engage and release said clamping means by the movement of the conveyor, and means for heating the sections to cook the batter therein.

6. In a machine of the character described, a continuous conveyor, a plurality of mold sections carried thereby, and each comprising a two-part book-mold socket member having toggle means to retain the same in closed position and move it to open position and a core member, a movable support for said core member, the latter being rigidly secured to said support, means for opening and closing said sections, means for supplying batter or the like to said sections during their open period, a clamping hook on one of said members and means on the other member adapted to be engaged thereby to retain said core member in engagement with said mold member, stationary cams disposed in the path of said hooks and adapted to be engaged thereby through the movement of the conveyor to release and engage said hook with said means on the other member, and means for heating the sections to cook the batter therein.

7. In a machine of the character described, a continuous conveyor, a plurality of mold sections carried thereby, and each comprising a mold socket member consisting of a pair of separable socket portions, and a core member, means for opening and closing said mold socket member, consisting of a yoke member pivotally connected to one of said portions, a link connected between said yoke member and the other socket member, said yoke adapted to be forcibly moved above and below the dead centers of said link to maintain the socket portions in closed and open positions, means adapted through the movement of the conveyor to engage said yoke member to move it, means adapted to move said core member out of engagement with said socket member during the open period of said socket member and into engagement therewith subsequent to the closing thereof, means for supplying batter or the like to said sections in the period between the closing of said socket member and the engagement therewith of the core member, and means for heating said sections to cook the batter therein.

8. In a machine of the character described, a continuous conveyor, a plurality of mold sections carried thereby and each comprising a mold socket member having a pair of mold recesses and a core member having a pair of cores to co-operate with said recesses, means for opening and closing said sections, means for supplying batter or the like thereto during their open period and comprising a pair of ejector cylinders having inlet and outlet openings, said outlet openings being disposed above the mold recesses of said mold socket members, valves adapted to alternately open and close said inlet and outlet openings of the cylinders, means for supplying batter through said inlet openings, pistons in said respective cylinders, a slide member adapted to reciprocate both of said pistons and operate both of said valves, said pistons adapted to reciprocate rearwardly during the open period of said inlet openings to draw in batter and forwardly during the open period of said outlet openings to eject the batter, and means for heating the sections to cook the batter therein.

9. In a machine of the character described, a continuous conveyor, a plurality of mold sections carried thereby, and each comprising a mold socket member and a core member, means for opening and closing said mold sections, means for supplying batter or the like thereto during their open period and comprising an ejector cylinder having inlet and outlet openings, a valve adapted to alternately open and close said respective openings, means for supplying batter through said inlet opening, a piston in said cylinder having a longitudinal slot therein, means for adjusting the effective length of said slot, a slide having means engaging said slot and adapted to reciprocate said piston during a portion of the forward and rearward movements thereof to eject and draw in batter, means operated by said slide for actuating said valve, and means for heating the sections to cook the batter therein.

10. In a machine of the character described, a continuous conveyor, a plurality of mold sections carried thereby, and each comprising a mold socket member consisting of a pair of separable socket portions, and a hingedly mounted core member, locking means for said mold sections, means for locking and unlocking said locking means, means operative after unlocking of said locking means for lifting the core member and permitting it to drop back into the mold to loosen the product in the mold by separation and impact of the core, means for subsequently opening and closing said mold socket member, means for moving said core member out of engagement with said socket member during the open period of said socket member and into engagement therewith subsequent to the closing thereof, means for supplying batter or the like to said sections in the period between the closing of said socket member and the engagement therewith of said core member, and means for heating said sections to cook the batter therein.

Signed at Bridgeport, in the county of Fairfield and State of Connecticut, this 15th day of April, A. D. 1930.

HARRY G. TATOSIAN.